United States Patent [19]

Tomotsugu et al.

[11] Patent Number: 5,338,613

[45] Date of Patent: Aug. 16, 1994

[54] PHOTOCURABLE URETHANE ACRYLATE RESIN COMPOSITION WHICH IS WEATHER RESISTANT

[75] Inventors: Akio Tomotsugu, Osaka; Keiji Hida, Ibaraki, both of Japan

[73] Assignee: Nippon Paint Co., Ltd., Osaka, Japan

[21] Appl. No.: 865,541

[22] Filed: Apr. 9, 1992

[30] Foreign Application Priority Data

Apr. 9, 1991 [JP] Japan ................................. 3-104720

[51] Int. Cl.⁵ ...................... B32B 27/00; B32B 27/40; C08G 71/04
[52] U.S. Cl. .................................. 428/425.8; 522/96; 522/97
[58] Field of Search ................... 522/96, 97; 428/425.8

[56] References Cited

U.S. PATENT DOCUMENTS

| | | | |
|---|---|---|---|
| 4,186,227 | 1/1980 | Wulff et al. | 528/302 |
| 4,370,387 | 1/1983 | Ueno et al. | 522/104 |
| 4,691,045 | 9/1987 | Fukuchi et al. | 522/96 |
| 4,745,003 | 5/1988 | Sirkoch et al. | 522/92 |

*Primary Examiner*—Susan Berman
*Attorney, Agent, or Firm*—Millen, White, Zelano & Branigan

[57] ABSTRACT

A photocurable resin composition comprising (a) 10 to 90 parts by weight of a urethane acrylate resin which is obtainable by reacting a polyester in which an alicyclic dicarboxylic acid component accounts for 100 mole percent of the total acid component and an aliphatic diol having a side chain and/or alicyclic diol accounts for 60 to 100 mole percent of the total alcohol component while an aliphatic tri- or polyol accounts for 40 to 0 mole percent with (i) an aliphatic or alicyclic polyisocyanate and an active hydrogen compound containing a polymerizable unsaturated group or (ii) a monofunctional isocyanate compound containing a polymerizable unsaturated group within the molecule, (b) 90 to 10 parts by weight of a non-aromatic crosslinking agent having at least one (meth)acryloyl group within the molecule, and (c) an effective amount of a photosensitizer to initiate a photopolymerization reaction between (a) and (b). The composition has a high degree of weather resistance corresponding to a weather-o-meter time of not less than 4,000 hours.

7 Claims, No Drawings

PHOTOCURABLE URETHANE ACRYLATE RESIN COMPOSITION WHICH IS WEATHER RESISTANT

FIELD OF THE INVENTION

The present invention relates to a photocurable resin composition with improved weather resistance.

BACKGROUND OF THE INVENTION

Photocurable resin compositions have been widely used in paints, printing ink, photoresists and so on. In the field of outdoor paints, high weather resistance is an important requisite. The conventional technology for providing a photocurable resin composition with high weather resistance can be generally divided into the incorporation of an ultraviolet absorber and the introduction of fluorine into the resin skeletal structure.

However, an ultraviolet absorber tends to absorb the radiation energy necessary for curing, so that a deficiency in curing tends to take place and the weather resistance obtainable is, at most, a weather-o-meter resistance time of about 2000 hours, thus making the composition unsuitable for outdoor applications. For the purpose of improving the curability of resin, there has been proposed a system employing an acrylic polyol/isocyanate and a UV-curable resin plus a light stabilizer but this system is disadvantageous in that it is a two-package system and does not provide a weather resistance beyond a weather-o-meter resistance time of 2000 hours.

Any resin composition obtainable by introducing fluorine atoms into the resin skeletal structure is so expensive that it is not practically useful, although it has high weather resistance.

There accordingly exists a demand for a photocurable resin composition which would have a weather resistance exceeding a weather-o-meter time of 4000 hours as well as other beneficial performance characteristics and be available at low cost.

Heretofore, the resin component of a photocurable resin composition generally consists of an oligomer or polymer containing a plurality of photopolymerizable unsaturated groups and a crosslinking agent or reactive diluent copolymerizable therewith. Thus is known a photocurable resin composition containing, as such oligomer or polymer containing a plurality of photopolymerizable unsaturated groups, a urethane acrylate resin derived from a polyether polyol, polyester polyol or acryl polyol but it has been difficult to simultaneously satisfy all the requirements of weather resistance, resistance to hydrolysis and wear resistance.

SUMMARY OF THE INVENTION

To resolve the above problems, the present invention provides a photocurable resin composition comprising (a) 10 to 90 parts by weight of a urethane acrylate resin which is obtainable by reacting a polyester in which an alicyclic dicarboxylic acid component accounts for 100 mole percent of the total acid component and an aliphatic diol having a side chain and/or alicyclic diol accounts for 60 to 100 mole percent of the total alcohol component while an aliphatic tri- or polyol accounts for 40 to 0 mole percent with (i) an aliphatic or alicyclic polyisocyanate and an active hydrogen compound containing a polymerizable unsaturated group or (ii) a monofunctional isocyanate compound containing a polymerizable unsaturated group within the molecule, (b) 90 to 10 parts by weight of a non-aromatic cross-linking agent having at least one (meth)acryloyl group within the molecule, and (c) an effective amount of a photosensitizer to initiate a photopolymerization reaction between (a) and (b).

Neither of the components (a) and (b) in the resin composition of the present invention contains an aromatic ring and the polyester skeleton of the urethane acrylate resin is a bulky structure. Therefore, this composition not only displays a remarkably high degree of weather resistance corresponding to a weather-o-meter time of not less than 4000 hours but also exhibits high resistance to hydrolysis and wear as well other beneficial properties.

DETAILED DESCRIPTION OF THE PREFERRED EMBODIMENTS (a) Components

The urethane acrylate resin as a constituent of the photocurable resin composition of the invention is prepared starting with the polyester described below.

Generally speaking, a polyester is the product of polycondensation reaction between a polycarboxylic acid and a polyhydric alcohol but the acid component of the polyester to be employed in the present invention is exclusively an alicyclic dicarboxylic acid.

The alicyclic dicarboxylic acid includes, inter alia, 1,2-cyclohexanedicarboxylic acid (hexahydrophthalic acid), its position isomers, 4-methylcyclohexane-1,2-dicarboxylic acid and so on.

Also usable are dicarboxylic acids available by the addition of halogen to the double bonds of unsaturated alicyclic dicarboxylic acids, such as tetrahydrophthalic acid, nadic acid and so on. In the actual esterification reaction, the corresponding acid anhydrides and lower alkyl, for example methyl, esters can also be employed.

As to the alcohol component, an aliphatic diol having a side chain or an alicyclic diol or a mixture thereof should account for at least 60 mole percent of the component.

The aliphatic diol having a side chain includes, among others, 1,2-propanediol, neopentyl glycol, 1,2-butanediol, 1,3-butanediol, 2,3-butanediol, 1,2pentanediol, 2,3-pentanediol, 1,4-pentanediol, 1,4-hexanediol, 2,5-hexanediol, 3-methyl-1,5-pentanediol, 1,2-dodecanediol, 3-(3-hydroxy-2,2-dimethylpropionyloxy)-2,2-dimethylpropanol (also known as hydroxypivalic acid neopentyl glycol ester) and so on.

The alicyclic diol includes, inter alia, 1,4-cyclohexanediol, 1,4-cyclohexanedimethanol and their position isomers.

It is to be understood that the aliphatic tri- or polyol may account for a maximum of 40 mole percent of the alcohol component. Examples of such polyol are trimethylolethane, trimethylolpropane, glycerol, diglycerol, pentaerythritol, dipentaerythritol and so on.

The esterification reaction can be carried out using the above-mentioned acid component and alcohol component in a per se known manner. The acid value of the product polyester is preferably not more than 10 mgKOH/g.

Two processes are available for synthesizing a urethane acrylate resin using the above-mentioned polyester. In one of the processes, this polyester is reacted with an aliphatic or alicyclic polyisocyanate compound, such as dicyclohexylmethane-4,4'-diisocyanate, hexamethylene diisocyanate, tetramethylene diisocyanate, lysine diisocyanate, xylylene diisocyanate, tetramethylxylylene diisocyanate, 1,3-bis(isocyanatomethyl)xylylene diisocyanate, trimethylhexamethylene diisocyanate, isophorone diisocyanate, etc., adducts of such isocyanates to water, trimethylolpropane, etc. and the corresponding cyclic trimers, in a NCO/OH ratio of not less than 2 to prepare an isocyanate-terminated urethane prepolymer and, by utilizing the residual isocyanate groups of the urethane prepolymer, an active hydrogen compound having a polymerizable unsaturated group, such as 2-hydroxyethyl (meth)acrylate, is added.

The other process comprises adding a monofunctional compound having a polymerizable unsaturated group within the molecule, such as 2-isocyanatoethyl (meth)acrylate, to the terminal hydroxyl group of said polyester.

Component (b)

The urethane acrylate resin, component (a), can be crosslinked with monomers which are commonly used in a photocurable resin composition but in the present invention there should not be employed an aromatic ring-containing crosslinking agent such as styrene and its derivatives, divinylbenzene and so on.

Therefore, as component (b), a compound containing at least one and preferably not less than two (meth)acryloyl groups within the molecule is employed. Typical species of such compound include ethylene glycol di(meth)acrylate, diethylene glycol di(meth)acrylate, trimethylolpropane tri(meth)acrylate, neopentyl glycol di(meth)acrylate, pentaerythritol tetra(meth)acrylate, glycerol tri(meth)acrylate and so on.

Component (b), as well as component (a), preferably has a bulky structure, and includes the following materials among others.

Shin Nakamura Kagaku Co., Ltd. acrylic monomer
  ADP-6 (dipentaerythritol hexacrylate-pentacrylate mixture);
Nippon Kayaku Co., Ltd. acrylic monomer
  DPCA 60 (dipentaerythritol-caprolactone adduct hexacrylate);
  HX-220, HX-620 [3-(3-hydroxy-2,2-dimethylpropanoyloxy)-2,2-dimethylpropanol/caprolactone adduct diacrylate];
  R-604 [2-(2-acryloyl-1,1-dimethylethyl)-5-acryloylmethyl-5-ethyl-1,3-dioxane];
  R-684 (4,7-methanoperhydroindenedimethanol diacrylate);
  R-526 [1,4-bis-(3-acryloyloxy-2,2-dimethylpropyloxycarbonyl)butane];
  HBA-240P [2,2-bis(4-acryloyloxypropyloxypropyloxycyclohexyl)propane];
Mitsubishi Rayon Co., Ltd. acrylic monomer
  UK-4101 [3-(3-hydroxy-2,2-dimethylpropanoyloxy)-2,2-dimethylpropanol diacrylate];
Toagosei Chemical Industry Co., Ltd.
  M-230 (diethylene glycol/β-propiolactone adduct diacrylate);
  M-330 (trimethylolpropane/β-propiolactone adduct triacrylate);
  TO-747 (pentaerythritol/β-propiolactone adduct tetracrylate);
  TO-755 (dipentaerythritol/β-propiolactone adduct hexacrylate);
  THEIC-TA2 [tri(acryloyloxyethyl) isocyanurate].
Component (C)

The photosensitizer mentioned hereinbefore may be a known compound, such as 2,2-dimethoxy-2-phenylacetophenone, 1-hydroxycyclohexyl phenyl ketone, benzoin, benzoin methyl ether, benzoin ethyl ether, benzoin propyl ether, 2-hydroxy-2-methylpropiophenone, benzil, benzophenone, 2-methyl[4-(methylthio)-phenyl]-2-morpholino-1-propanone, 2-methylanthraquinone, 2,4-diethylthioxanthone, methylphenyl glyoxylate, acylphosphine oxides and so on.

Photocurable resin composition

The photocurable resin composition of the present invention comprises 10 to 90 parts by weight of component (a) and 90 to 10 parts by weight of component (b). The preferred proportions are 25 to 75 parts by weight of component (a) and 75 to 25 parts by weight of component (b). If the proportion of component (a) is too large, a cured film with sufficient hardness cannot easily be obtained. Conversely, with a lesser amount of component (a), the coating film will be deficient in elongation and be brittle.

The photosensitizer (c) is used in a proportion of 0.1 to 20 percent by weight and preferably 0.3 to 10 percent by weight, based on the sum of component (a) and (b). With a lesser amount of the photosensitizer, the composition fails to cure well, while an excess of it results in poor cured film qualities.

The composition of the invention may, of course, optionally contain the common additives such as ultraviolet light stabilizers, ultraviolet absorbers, pigments, solvents and so on.

Among such ultraviolet light stabilizers are hindered amine type stabilizers such as bis(2,2,6,6-tetramethyl-4-piperidyl)sebacate, bis(1,2,2,6,6-penta-methyl-4-piperidyl)sebacate, 4-benzoyloxy-2,3,6,6-tetramethylpiperidine, poly[(6-morpholino-s-triazine-2,4-diyl)[(2,2,6,6-tetramethyl-4-piperidyl)imino]-hexamethylene[(2,2,6,6-tetramethyl-4-piperidyl)imino)], N-2,2,6,6-tetramethyl-4-piperidyl-2-(2,2,6,6-tetramethyl-4-piperidylamino)-2-methylpropionamide, bis(1,2,2,6,6-pentamethyl-4-piperidyl) 2-(3,5-di-t-butyl-4-hydroxybenzyl)-2-n-butylmalonate and so on. The proportion of such ultraviolet light stabilizer is 0.1 to 15 percent by weight and preferably 0.5 to 10 percent by weight based on the sum of components (a) and (b).

The ultraviolet absorber includes, inter alia, salicylic acid derivatives, benzophenone compounds, benzotriazole compounds, cyanoadrylates, etc., although in terms of yellowing on cure, those in the benzophenone series are preferred. Thus, for example, 2,4-hydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, ethyl-2-cyano-3,3-diphenyl acrylate, etc. may be mentioned.

The pigment includes color pigments such as titanium dioxide, carbon black, lake pigments, etc., extender pigments such as talc, barium sulfate, etc. and metallic gloss pigments such as aluminum powder, mica powder, etc. However, the proportion of such pigments should not be large enough to interfere with ultraviolet curing.

The solvent may be used for controlling the viscosity of the composition and may be an ordinary paint solvent.

The composition of the invention can be applied to a substrate by the conventional coating procedure and, after drying where necessary, cured with ultraviolet rays. This photocuring process is not different from that used for a conventional photocurable resin composition. The composition of the invention is of use in a variety of applications other than coating, for example in the field of printing ink, photoresist, etc. and can be applied by the techniques established in the respective fields of art.

In the following production examples, working examples and comparative examples, which are intended to illustrate the present invention in further detail, all parts and % are by weight unless otherwise indicated.

PRODUCTION EXAMPLE 1

A flask fitted with a stirrer, temperature control, reflux condenser and decanter was charged with 309.6 g (2 mols) of hexahydrophthalic anhydride, 624.6 g (3 mols) of 3-(3-hydroxy-2,2-dimethylpropanoyloxy)-2,2-dimethylpropanol (hydroxypivalic acid neopentyl glycol ester), 0.93 g of dibutyltin oxide and 28 g of xylene and the esterification reaction was conducted at 230° C. with stirring for 6 hours, with the byproduct water being azeotropically distilled off. The resulting polyester had an acid value of 3 mg KOH/g.

This polyester was cooled to 50° C. and 444 g (2 mols) of isophorone diisocyanate, 672 g of butyl acetate and 0.81 g of hydroquinone were added. The mixture was reacted at 80° C. with constant stirring for 1 hour. Thereafter, a solution consisting of 252.2 g (2.2 mols) of 2-hydroxyethyl acrylate and 0.81 g of hydroquinone was added dropwise at 80° C. with stirring over a period of 1 hour. The reaction was further continued for 3 hours, at the end of which time the absorption of the NCO group was no longer observed in the infrared absorption spectrum. The procedure gave a urethane acrylate resin solution A (nonvolatile matter 70%).

Similarly, urethane acrylate resins B~E and G~K were prepared. The compositions of these resins are shown in Tables 1 and 2.

PRODUCTION EXAMPLE 2

A flask fitted with a stirrer, temperature control, reflux condenser and decanter was charged with 135.9 g (1 mol) of trimethylolpropane, 464.4 g (3 mols) of hexahydrophthalic anhydride, 624.6 g (3 mols) of 3-(3-hydroxy-2,2-dimethylpropanoyloxy)-2,2-dimethylpropanol, 1.22 g of dibutyltin oxide and 36.7 g of xylene and the esterification reaction was conducted at 230° C. with stirring for 6 hours, with the byproduct water being azeotropically distilled off. The resulting polyester had an acid value of 3 mg KOH/g.

After the polyester was cooled to 50° C., 465.3 g mols) of 2-isocyanatoethyl(meth)acrylate, 688.9 g of butyl acetate and 1.69 g of hydroquionone were added and the reaction was carried out at 80° C. with stirring for 3 hours. The end point of reaction was confirmed from disappearance of the absorption of NCO in the IR spectrum. The procedure gave a urethane acrylate resin F (nonvolatile matter 70%).

Similarly, a urethane acrylate resin L was obtained. The compositions of these resins are shown in Table 2.

TABLE 1

| Starting compound (mols) | A | B | C | D | E | F |
|---|---|---|---|---|---|---|
| Hexahydrophthalic acid | 2 | 3 | — | — | 3 | 3 |
| 4-Methylhexahydrophthalic acid | — | — | 4 | — | — | — |
| 1,4-Cyclohexanedicarboxylic acid | — | — | — | 6 | — | — |
| Hydroxypivalic acid neopentyl glycol ester | 3 | 3 | 4 | 6 | 1.5 | 3 |
| 1,4-Hexanediol | — | — | — | — | 1.5 | — |
| Trimethylolpropane | — | 1 | — | — | 1 | 1 |
| Pentaerythritol | — | — | 1 | — | — | — |
| Dipentaerythritol | — | — | — | 1 | — | — |
| Isophorone diisocyanate | 2 | 3 | 4 | 6 | 3 | — |
| 2-Hydroxyethyl acrylate | 2.2 | 3.3 | 4.4 | 6.6 | 3.3 | — |
| Isocyanatoethyl methacrylate | — | — | — | — | — | 3 |

TABLE 2

| Starting compound (mols) | G | H | I | J | K | L |
|---|---|---|---|---|---|---|
| Tetrahydrophthalic acid | 2 | 3 | — | — | 3 | 3 |
| Adipic acid | — | — | 4 | — | — | — |
| Isophthalic acid | — | — | — | 6 | — | — |
| 1,5-Pentanediol | 3 | 3 | 4 | 6 | — | 3 |
| Ethylene glycol | — | — | — | — | 3 | — |
| Trimethylolpropane | — | 1 | — | — | 1 | 1 |
| Pentaerythritol | — | — | 1 | — | — | — |
| Dipentaerythritol | — | — | — | 1 | — | — |
| Isophorone diisocyanate | 2 | 3 | 4 | 6 | 3 | — |
| 2-Hydroxyethyl acrylate | 2.2 | 3.3 | 4.4 | 6.6 | 3.3 | — |
| Isocyanatoethyl methacrylate | — | — | — | — | — | 3 |

EXAMPLE 1 AND COMPARATIVE EXAMPLE 1

Using urethane acrylate resins A through F (Examples) and G through L (Comparative Examples), photocurable resin compositions (nonvolatile matter 50%) were prepared as indicated in Table 3 (Examples) and Table 4 (Comparative Examples). Automotive shell steel sheets pretreated and precoated as shown below were spray-coated with these resin compositions in a coating thickness of 30 to 50μ.

Degreasing with Nippon Paint Co., Ltd. Surf Cleaner SD 550

Chemical pretreatment with Nippon Paint Co., Ltd. Surf Dyne SD 5000

Electrodeposition with Nippon Paint Co., Ltd. Powertop U80, a cationic electrodeposit coating composition, in a coating thickness of 30μ (dried), followed by baking at 180° C. for 20 minutes.

Base coating with Nippon Paint Co., Ltd. Orga P-2, an oil-free alkyd resin intermediate coating composition in a coating thickness of 35μ (dried), followed by baking at 140° C. for 20 minutes and water sanding.

Top coating with Nippon Paint Co., Ltd. Orga S-30 White, a polyester top coating composition, in a coating thickness of 35μ (dried), followed by baking at 140° C. for 20 minutes.

Water sanding with No. 800 brasive paper.

The spray-coated sheets were set at 80° C. for 5 minutes and, then, passed under a 80 w/cm high-pressure mercury lamp (ozone type with elliptical reflector; distance from the lower edge of the lamp fixture to the sample=8 cm) at a speed of 3 m/min. for UV curing.

The results of weather resistance testing of the cured samples are shown in Tables 3 and 4 (Examples) and Tables 5 and 6 (Comparative Examples).

TABLE 3

| Component (parts by weight) | Example | | | | | | | | |
|---|---|---|---|---|---|---|---|---|---|
| | A | | | B | | | C | | |
| Resin composition (nonvolatile matter 70%) | 107 | 71.4 | 35.7 | 107 | 71.4 | 35.7 | 107 | 71.4 | 35.7 |

TABLE 3-continued

| Component (parts by weight) | Example A | | | B | | | C | | |
|---|---|---|---|---|---|---|---|---|---|
| ADP-6 | 25 | | | 25 | | | 25 | | |
| DPCA 60 | | 50 | | | 50 | | | 50 | |
| UK-4102 | | | 75 | | | 75 | | | 75 |
| D-1116 | 5 | 5 | 5 | 5 | 5 | 5 | 5 | 5 | 5 |
| LS-292 | 2 | 2 | 2 | 2 | 2 | 2 | 2 | 2 | 2 |
| F-177 | 0.1 | 0.1 | 0.1 | 0.1 | 0.1 | 0.1 | 0.1 | 0.1 | 0.1 |
| Butyl acetate | 75.1 | 85.7 | 96.4 | 75.1 | 85.7 | 96.4 | 75.1 | 85.7 | 96.4 |
| 2000 H Appearance | ○ | ○ | ○ | ○ | ○ | ○ | ○ | ○ | ○ |
| Δ E | 1.4 | 2.0 | 1.7 | 1.4 | 1.6 | 1.1 | 1.4 | 1.6 | 1.2 |
| G. R. | 90 | 88 | 91 | 92 | 90 | 93 | 90 | 89 | 92 |
| 4000 H Appearance | ○ | ○ | ○ | ○ | ○ | ○ | ○ | ○ | ○ |
| Δ E | 2.2 | 2.3 | 2.0 | 2.2 | 2.5 | 2.0 | 2.5 | 2.6 | 2.1 |
| G. R. | 80 | 83 | 81 | 81 | 84 | 82 | 81 | 82 | 83 |

TABLE 4

| Component (parts by weight) | Example D | | | E | | | F | | |
|---|---|---|---|---|---|---|---|---|---|
| Resin composition (nonvolatile matter 70%) | 107 | 71.4 | 35.7 | 107 | 71.4 | 35.7 | 107 | 71.4 | 35.7 |
| ADP-6 | 25 | | | 25 | | | 25 | | |
| DPCA 60 | | 50 | | | 50 | | | 50 | |
| UK-4102 | | | 75 | | | 75 | | | 75 |
| D-1116 | 5 | 5 | 5 | 5 | 5 | 5 | 5 | 5 | 5 |
| LS-292 | 2 | 2 | 2 | 2 | 2 | 2 | 2 | 2 | 2 |
| F-177 | 0.1 | 0.1 | 0.1 | 0.1 | 0.1 | 0.1 | 0.1 | 0.1 | 0.1 |
| Butyl acetate | 75.1 | 85.7 | 96.4 | 75.1 | 85.5 | 96.4 | 75.1 | 85.7 | 96.4 |
| 2000 H Appearance | ○ | ○ | ○ | ○ | ○ | ○ | ○ | ○ | ○ |
| Δ E | 1.6 | 1.7 | 1.8 | 1.6 | 1.7 | 2.0 | 1.8 | 1.7 | 1.6 |
| G. R. | 93 | 90 | 94 | 88 | 93 | 92 | 87 | 86 | 80 |
| 4000 H Appearance | ○ | ○ | ○ | ○ | ○ | ○ | ○ | ○ | ○ |
| Δ E | 2.7 | 2.4 | 2.8 | 2.6 | 2.5 | 2.7 | 2.7 | 2.8 | 2.9 |
| G. R. | 83 | 85 | 83 | 81 | 84 | 82 | 80 | 81 | 80 |

TABLE 5

| Component (parts by weight) | Comparative Example G | | | H | | | I | | |
|---|---|---|---|---|---|---|---|---|---|
| Resin composition (nonvolatile matter 70%) | 107 | 71.4 | 35.7 | 107 | 71.4 | 35.7 | 107 | 71.4 | 35.7 |
| ADP-6 | 25 | | | 25 | | | 25 | | |
| DPCA 60 | | 50 | | | 50 | | | 50 | |
| UK-4102 | | | 75 | | | 75 | | | 75 |
| D-1116 | 5 | 5 | 5 | 5 | 5 | 5 | 5 | 5 | 5 |
| LS-292 | 2 | 2 | 2 | 2 | 2 | 2 | 2 | 2 | 2 |
| F-177 | 0.1 | 0.1 | 0.1 | 0.1 | 0.1 | 0.1 | 0.1 | 0.1 | 0.1 |
| Butyl acetate | 75.1 | 85.7 | 96.4 | 75.1 | 85.7 | 96.4 | 75.1 | 85.7 | 96.4 |
| 2000 H Appearance | ○ | ○ | ○ | ○ | ○ | ○ | ○ | ○ | ○ |
| Δ E | — | 5.4 | 4.8 | — | 3.8 | 4.9 | — | 3.7 | 4.2 |
| G. R. | — | 85 | 88 | — | 90 | 92 | — | 94 | 95 |
| 4000 H Appearance | x | x | x | x | x | x | x | x | x |
| Δ E | — | — | — | — | — | — | — | — | — |
| G. R. | — | — | — | — | — | — | — | — | — |

TABLE 6

| Component (parts by weight) | Comparative Example J | | | K | | | L | | |
|---|---|---|---|---|---|---|---|---|---|
| Resin composition (nonvolatile matter 70%) | 107 | 71.4 | 35.7 | 107 | 71.4 | 35.7 | 107 | 71.4 | 35.7 |
| ADP-6 | 25 | | | 25 | | | 25 | | |
| DPCA 60 | | 50 | | | 50 | | | 50 | |
| UK-4102 | | | 75 | | | 75 | | | 75 |
| D-1116 | 5 | 5 | 5 | 5 | 5 | 5 | 5 | 5 | 5 |
| LS-292 | 2 | 2 | 2 | 2 | 2 | 2 | 2 | 2 | 2 |
| F-177 | 0.1 | 0.1 | 0.1 | 0.1 | 0.1 | 0.1 | 0.1 | 0.1 | 0.1 |
| Butyl acetate | 75.1 | 85.7 | 96.4 | 75.1 | 85.7 | 96.4 | 75.1 | 85.7 | 96.4 |
| 2000 H Appearance | ○ | ○ | ○ | x | ○ | ○ | x | ○ | ○ |
| Δ E | 3.1 | 3.2 | 3.5 | — | 4.3 | 4.7 | — | 4.5 | 4.2 |
| G. R. | 92 | 94 | 93 | — | 86 | 88 | — | 85 | 87 |
| 4000 H Appearance | Δ | Δ | Δ | x | x | x | x | x | x |
| Δ E | 4.3 | 4.9 | 5.2 | — | — | — | — | — | — |
| G. R. | 63 | 68 | 70 | — | — | — | — | — | — |

Components in Tables 3, 4, 5 and 6

ADP-6: Shin Nakamura Kagaku Co., Ltd. acrylic monomer (dipentaerythritol hexacrylate-pentacrylate mixture)
DPCA60: Nippon Kayaku Co., Ltd. acrylic monomer (dipentaerythritol-caprolactone adduct hexacrylate)
UK-4101: Mitsubishi Rayon Co. Ltd. acrylic monomer (hydroxypivalic acid neopentyl glycol ester diacrylate)
D-1116: Merck Japan Co., Ltd. Photosensitizer (1-(4-isopropylphenyl)-2-hydroxy-2-methylpropan-1-one)
LS-292: Ciba-Geigy Ltd. light stabilizer (bis-(N-methyl-2,2,6,6-tetramethyl-4-piperidyl)sebacate)
F-177: Dainippon Ink And Chemicals, Inc. fluorine type surfactant Method for weather resistance test Using a sunshine carbon weather-o-meter (Suga Testing Machinery WEL-SUN-HC-E), each sample was exposed to the conditions of rainfall 12 minutes/cycle time 60 minutes and black panel temperature 63°±3° C. for 2,000 and 4,000 hours. The results were evaluated in terms of appearance, color difference and gloss retention.

(1) Appearance
Each sample was visually observed for blisters, cracks, clouding, etc. and evaluated according to the following criteria.
○ No significant defect
Δ Slight cracks, clouding, etc.
x Very poor appearance (2) Color difference (ΔE)
Macbeth Color Eye (MS2020Plus) was used as a spectrophotometer and the ΔE from the initial value was determined using the L* a* b* system.

(3) Gloss retention (G.R.)
Using a glossmeter, the 60°—60° gross value was measured and the G.R. was calculated by means of the following equation.

G.R.=(gloss after exposure/gloss before exposure)×100

EXAMPLE 2

Using the urethane acrylate resin B, a photopolymerizable coating composition with a nonvolatile matter content of 50% was prepared as shown in Table 7. This composition was coated, cured and subjected to weather resistance testing as in Example 1. The results are set forth in Table 7.

COMPARATIVE EXAMPLE 2

Using the urethane acrylate resin H, a photopolymerizable coating composition with a nonvolatile matter content of 50% was prepared. This composition was coated, cured and subjected to weather resistance testing as in Example 1. The results are set forth in Table 7.

TABLE 7

| Component (parts by weight) | Example 2 | | | Comparative Example 2 | | |
|---|---|---|---|---|---|---|
| | 1 | 2 | 3 | 4 | 5 | 6 |
| Urethane acrylate B | 71.4 | 71.4 | 71.4 | | | |
| Urethane acrylate H | | | | 71.4 | 71.4 | 71.4 |
| Neopentyl glycol diacrylate | 50 | | | 50 | | |
| Trimethylolpropane triacrylate | | 50 | | | 50 | |
| Pentaerythritol tetracrylate | | | 50 | | | 50 |
| D-1116 | 5 | 5 | 5 | 5 | 5 | 5 |
| LS-292 | 2 | 2 | 2 | 2 | 2 | 2 |
| F-177 | 0.1 | 0.1 | 0.1 | 0.1 | 0.1 | 0.1 |
| Butyl acetate | 85.7 | 85.7 | 85.7 | 85.7 | 85.7 | 85.7 |
| 2000 H Appearance | ○ | ○ | ○ | Δ | x | x |
| ΔE | 1.9 | 1.8 | 1.7 | 3.2 | — | — |
| G. R. | 88 | 90 | 92 | 84 | — | — |

EXAMPLE 3

Using the urethane acrylate B, a photopolymerizable coating composition with a nonvolatile matter content of 50% was prepared as in Table 8. This composition was coated and cured as in Example 1. The results of weather resistance testing are set forth in Table 8.

TABLE 8

| Component (parts by weight) | Example 3 | | | | | | |
|---|---|---|---|---|---|---|---|
| | 7 | 8 | 9 | 10 | 11 | 12 | 13 |
| Urethane acrylate B | 71.4 | 71.4 | 71.4 | 71.4 | 71.4 | 71.4 | 71.4 |
| R-604 | 50 | | | | | | |
| HX-220 | | 50 | | | | | |
| R-684 | | | 50 | | | | |
| R-526 | | | | 50 | | | |
| M-330 | | | | | 50 | | |
| TO-747 | | | | | | 50 | |
| HBA-240P | | | | | | | 50 |
| D-1116 | 5 | 5 | 5 | 5 | 5 | 5 | 5 |
| LS-292 | 2 | 2 | 2 | 2 | 2 | 2 | 2 |
| F-177 | 0.1 | 0.1 | 0.1 | 0.1 | 0.1 | 0.1 | 0.1 |
| Butyl acetate | 85.7 | 85.7 | 85.7 | 85.7 | 85.7 | 85.7 | 85.7 |
| 4000 H Appearance | ○ | ○ | ○ | Δ | ○ | ○ | ○ |
| ΔE | 2.4 | 2.8 | 2.7 | 2.6 | 2.2 | 2.4 | 2.7 |
| G. R. | 81 | 85 | 83 | 84 | 82 | 84 | 81 |

What is claimed is:
1. A photocurable resin composition comprising
(a) 10 to 90 parts by weight of a urethane acrylate resin which is a reaction product of
 (A) a polyester having
  (1) an alicyclic dicarboxylic acid component selected from the group consisting of hexahydrophthalic acid, 4-methylhexahydrophthalic acid and 1,4-cyclohexane-dicarboxylic acid which accounts for 100 mole percent of the total acid component of the polyester, and
  (2) an alcohol component selected from the group consisting of 3-(3-hydroxy-2,2-dimethylpropanoyloxy)-2,2-dimethylpropanol or a mixture thereof with at least one of 1,4-hexanediol, trimethylolpropane, pentaerythritol and dipentaerythritol, with
 (B) either
  (i) an aliphatic or alicyclic polyisocyanate and then with an active hydrogen compound containing a polymerizable unsaturated group or
  (ii) a monofunctional isocyanate compound having a polymerizable unsaturated group;
(b) 90 to 10 parts by weight of an acrylic or methacrylic acid ester of a non-aromatic polyol as a non-aromatic crosslinking agent; and

(c) an amount of a photosensitizer effective to initiate a photopolymerization reaction between (a) and (b).

2. The photocurable resin composition of claim 1 wherein the acid component of the polyester is exclusively cyclohexanedicarboxylic acid and 60 to 100 mol percent of the total alcohol component is 3-(3-hydroxy-2,2-dimethylpropanoyloxy)-2,2-dimethylpropanol.

3. The photocurable resin composition of claim 1, wherein the acid component of the polyester is hexahydrophthalic acid.

4. The photocurable resin composition of claim 1, wherein the proportions of component (a) and component (b) are 25 to 75 parts by weight and 75 to 25 parts by weight, respectively.

5. The photocurable resin composition of claim 1 wherein the photosensitizer is present in a proportion of 0.3 to 10 percent by weight, based on the sum of components (a) and (b).

6. In a coated substrate exposed to weather which is coated with an outdoor paint, the improvement wherein the substrate is coated with a cured composition according to claim 1.

7. A coated substrate according to claim 6 wherein the substrate is automotive shell steel.

* * * * *